(12) United States Patent
Pandey

(10) Patent No.: US 10,439,761 B1
(45) Date of Patent: Oct. 8, 2019

(54) PHYSICAL LAYER DEVICE AND METHOD FOR PERFORMING PHYSICAL LAYER OPERATIONS IN A COMMUNICATIONS NETWORK

(71) Applicant: NXP B.V., Eindhoven (NL)

(72) Inventor: Sujan Pandey, Waalre (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/044,325

(22) Filed: Jul. 24, 2018

(51) Int. Cl.
*H04L 1/00* (2006.01)
*H04L 25/14* (2006.01)

(52) U.S. Cl.
CPC .......... *H04L 1/0071* (2013.01); *H04L 1/0002* (2013.01); *H04L 1/0057* (2013.01); *H04L 25/14* (2013.01); *H04L 1/0046* (2013.01)

(58) Field of Classification Search
CPC ............. H03M 13/1515; H04L 1/0046; H04L 1/0057; H04L 1/0058; H04L 1/0071; H04L 1/0083; H04L 1/0084; H04L 1/009; H04L 1/0091; H04L 25/14; G06F 11/10; G11B 20/1809; G11B 20/1813; G11B 20/1866; G11B 2020/1833; G11B 2020/1836; G11B 2020/184
USPC ......... 375/257, 260–262, 265, 284; 714/756, 714/759, 800, 802
See application file for complete search history.

(56) References Cited

U.S. PATENT DOCUMENTS

| | | | | |
|---|---|---|---|---|
| 5,907,560 A * | 5/1999 | Spruyt | .............. | H03M 13/2703 714/701 |
| 5,956,338 A * | 9/1999 | Ghaibeh | ............. | H04L 12/2801 370/236.2 |
| 6,812,870 B1* | 11/2004 | Kryzak | ............... | H04L 25/4908 341/58 |
| 7,278,081 B1* | 10/2007 | Blair | ..................... | H04L 1/0083 714/701 |
| 2008/0256421 A1* | 10/2008 | Gerstel | ............... | H03M 13/353 714/776 |
| 2015/0317197 A1* | 11/2015 | Blair | ...................... | G06N 7/005 714/47.3 |
| 2017/0180071 A1* | 6/2017 | Stracca | ................. | H04J 3/0688 |
| 2018/0183629 A1 | 6/2018 | Pandey | | |

OTHER PUBLICATIONS

Niels Lambrecht, H. Pues; "A Circuit Modeling Technique for the ISO 7637-3 Capacitive Coupling Clamp Test"; IEEE Transactions on Electromagentic Compatibility, 2017; 8 pgs.

(Continued)

*Primary Examiner* — Young T Tse
(74) *Attorney, Agent, or Firm* — Rajeev Madnawat

(57) ABSTRACT

Embodiments of a method and a device are disclosed. In an embodiment, a method for performing physical layer operations in a point-to-point network is disclosed. The method involves receiving, from a link in the communications network, information in an operations, administration, and management (OAM) word, setting an interleaving level, L, in response to the information received in the OAM word, inserting an OAM word into a forward error correction (FEC) frame, the OAM word including the set interleaving level (L), and transmitting, onto the link in the communications network, the FEC frame, which includes the OAM word.

20 Claims, 9 Drawing Sheets

(56) References Cited

OTHER PUBLICATIONS

"Road vehicles—Electical distubances from conduction and coupling"; ISO 7637-3, Second edition, Jul. 1, 2007, 11 pgs.

Wu, P. "Multi-level PAM Study for M-Gig Automotive PHYs-II", Marvell, 10 pgs., retrieved from the internet at: http://www.ieee802.org/3/ch/public/may18/wu_3ch_01a_0518.pdf (May 2018).

McClellan, B. "2.5GBASE-T1 PHY Strawman", IEEE 802.3cn Task Force, Marvell, 9 pgs., retrieved from the internet at: http://www.ieee802.org/3/ch/public/may18/McClellan_3ch_01a_0518.pdf (May 2018).

Tu, M. "Preliminary Study of Noise Effects on Multi-Gigabit Automotive Phy Designs", IEEE 802.3ch Task Force, Broadcom, 17 pgs., retrieved from the internet at: http://www.ieee802.org/3/ch/public/may18/tu_3ch_01b_0518.pdf (May 24, 2018).

Tu, M. "RS FEC Proposal for Multi-Gigabit Automotive PHY", Broadcom, 7 pgs., IEEE 802.3ch Task Force, retrieved from the Internet at: http://www.ieee802.org/3/ch/public/adhoc/tu_3ch_01a_0718.pdf (Jul. 2018).

Farjadrad, R. et al. "Aquantia Accelerating Connectivity—FEC/Framing/Modulation for 10GBASE-T1 PHY", 22 pgs., Aquantia, retrieved from the internet at: http://www.ieee802.org/3/ch/public/adhod/farjarad_3chah_01b_061218.pdf (2018).

\* cited by examiner

PHYSICAL LAYER DEVICE AND METHOD FOR PERFORMING PHYSICAL LAYER OPERATIONS IN A COMMUNICATIONS NETWORK

FIELD OF THE INVENTION

The invention relates to physical layer operations, for example, physical layer operations in Ethernet connections.

BACKGROUND

Ethernet is a communications technology that has been used in the automotive industry to provide higher bandwidth than some other conventional in-vehicle network (IVN) technologies such as Controller Area Network (CAN) and FlexRay. Automotive Ethernet technology typically uses a twisted pair of copper wires as the transmission medium.

Automobiles can be a noisy environment with respect to in-vehicle networks. For example, Ethernet communications can be affected by, for example, external low frequency short impulse interference, narrow band radio frequency (RF) interference, and decision feedback equalizer (DFE) error propagation. Various techniques have been used at the physical layer to provide reliable point-to-point communications in an Ethernet network, including, for example, forward error correction (FEC) with Reed-Solomon encoding and FEC frame interleaving.

SUMMARY

Embodiments of a method and a device are disclosed. In an embodiment, a method for performing physical layer operations in a point-to-point network is disclosed. The method involves receiving, from a link in the communications network, information in an operations, administration, and management (OAM) word, setting an interleaving level, L, in response to the information received in the OAM word, inserting an OAM word into a forward error correction (FEC) frame, the OAM word including the set interleaving level (L), and transmitting, onto the link in the communications network, the FEC frame, which includes the OAM word.

In an embodiment, the method involves adjusting the interleaving level, L, in response to information received in a subsequent OAM word and transmitting another OAM word that includes the adjusted interleaving level, L, in a subsequent FEC frame.

In an embodiment, the FEC frame includes a bitstream from a higher network layer.

In an embodiment, the interleaving level, L, is an integer value that indicates the number of FEC frames that are to be interleaved.

In an embodiment, the interleaving level, L, can indicate no interleaving or interleaving of N or more frames, where N is an integer of greater than or equal to two.

In an embodiment, the received OAM word is extracted from a received bit stream at a physical coding sublayer receiver (PCS-RX) and wherein the transmitted OAM word is inserted into a transmitted bit stream at a physical coding sublayer transmitter (PCS-TX).

In an embodiment, the information received in the OAM word is information related to a bit error rate (BER) at a remote node.

In an embodiment, the interleaving level, L, is increased in response the BER increasing.

In an embodiment, the interleaving level, L, is decreased in response to the BER decreasing.

An embodiment of a physical layer (PHY) device for a communications network is disclosed. The PHY device includes a physical coding sublayer transmitter (PCS-TX), a physical medium attachment transmitter (PMA-TX), a physical coding sublayer receiver (PCS-RX), a physical medium attachment receiver (PMA-RX), and forward error correction (FEC) frame interleaving level management logic, the FEC frame interleaving level management logic configured to receive, from the PCS-RX and the PMA-RX, information in an operations, administration, and management (OAM) word, set an interleaving level, L, in response to the information received in the OAM word, and communicate the set interleaving level, L, to the PCS-TX for transmission via the PMA-TX.

In an embodiment, the PHY device is configured to insert an OAM word into an FEC frame, the OAM word including the set interleaving level, L and transmit, onto the link in the communications network, the FEC frame, which includes the OAM word.

In an embodiment, the FEC frame interleaving level management logic is further configured to adjust the interleaving level, L, in response to information received in a subsequent OAM word and to transmit another OAM word that includes the adjusted interleaving level, L, in a subsequent FEC frame.

In an embodiment, the information received in the OAM word is information related to a bit error rate (BER) at a remote node.

In an embodiment, the interleaving level, L, is increased in response the BER increasing and wherein the interleaving level, L, is decreased in response to the BER decreasing.

An embodiment of a method for performing physical layer operations in a communications network is disclosed. The method involves setting an interleaving level, L, at a node in the communications network, inserting an OAM word into a forward error correction (FEC) frame, the OAM word including the set interleaving level, L, and transmitting, onto a link in the communications network, the FEC frame, which includes the OAM word.

In an embodiment, the FEC frame includes a bitstream from a higher network layer.

In an embodiment, setting the interleaving level, L, involves obtaining latency information from a latency register, and setting the interleaving level, L, in response to the latency information.

In an embodiment, the latency information is received at the register from a higher layer than the physical layer.

In an embodiment, the interleaving level, L, is increased in response the latency information indicating that payload data carried in the FEC frame is less time sensitive.

In an embodiment, the interleaving level, L, is decreased in response to the latency information indicating that payload data carried in the FEC frame is more time sensitive.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
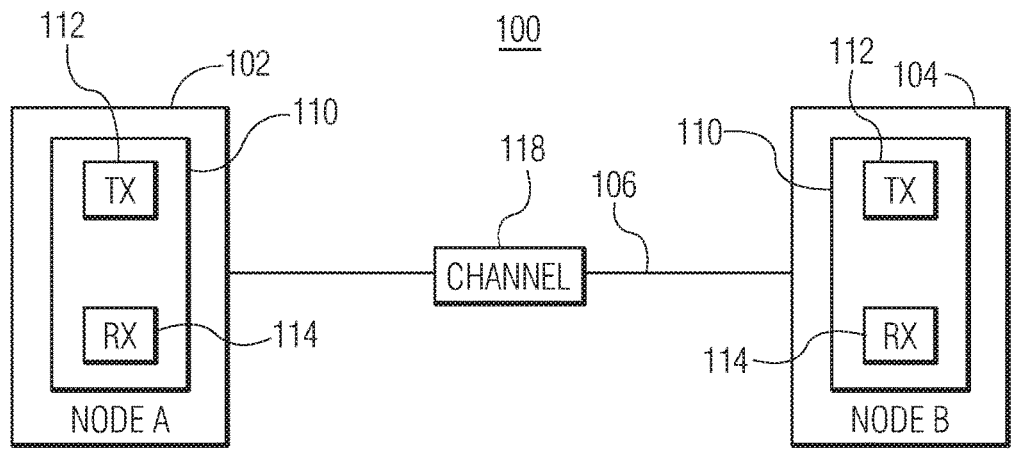
FIG. 1 depicts a communications network that connects two nodes via a physical link.

FIG. 1 depicts a communications network 100 that connects two nodes, node A 102 and node B 104, via a physical link 106 such as an unshielded twisted pair of copper wires, e.g., 10BASE-T1L. In an embodiment, the network is an in-vehicle network (IVN) that uses Ethernet at the data link layer, as specified in the Open Systems Interconnection (OSI) model as published by the International Organization for Standardization (ISO). Each node includes a transceiver 110 that includes a transmitter 112 and a receiver 114. Data is communicated in a channel 118 across the physical link 106. In an embodiment, a channel may be a logical channel that is specified at a layer higher than the physical layer. As used herein, a link or a communications link refers to a communications pathway that is supported by a physical link, such as twisted pair wires, and various communications protocols that are implemented at different layers in the OSI mode to achieve successful data communications between two or more nodes. Although FIG. 1 shows only two nodes in the communications network, the communications network may include more than two nodes. In general, high speed Ethernet (e.g., greater than 10 Mbits/s) uses point-to-point network configurations but there are network configurations that involve point-to-multipoint. The techniques described herein are applicable to point-to-point and point-to-multipoint network configurations.

At the physical layer, Reed-Solomon encoding has been used to improve the quality of point-to-point communications across an Ethernet link. Various parameters can be evaluated to determine a desirable Reed-Solomon encoding scheme. Even when Reed-Solomon encoding is used, sources of interference can still degrade the performance of an in-vehicle network. Some sources of error include external low frequency short impulse interference that is picked up by a channel (e.g., the cable acts as an antenna and given an imbalance of cable it can produce differential short impulse signals at the input of receiver), narrow band RF interference in which a continuous time, narrow band RF signal is picked up by a channel, which converts a common mode signal to a differential signal due to cable imbalance, and decision feedback equalizer (DFE) error propagation, e.g., if a symbol is decoded incorrectly at a slicer then it may estimate a wrong value of DFE coefficients, which creates DFE error propagation.

Figure 2:
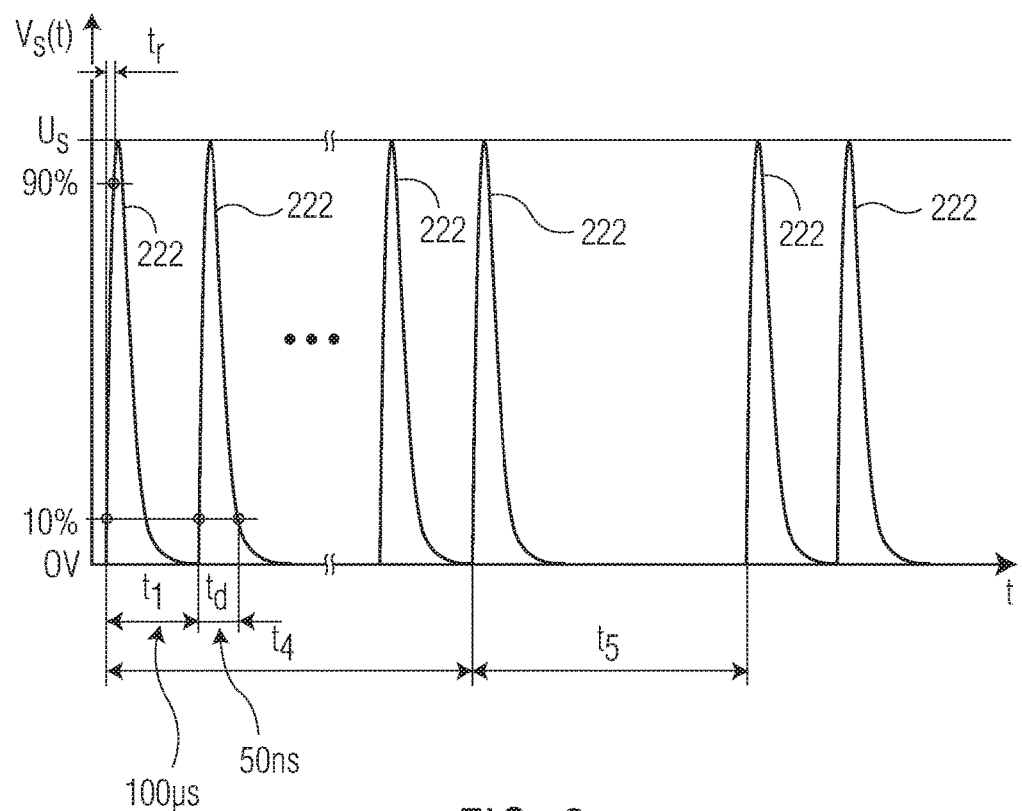
FIG. 2 depicts short impulse signals, as a graph of voltage versus time, which may create interference during the transmission of bits across a link.

In some cases, interference appears on the link as a short impulse signal, or "burst error." FIG. 2 depicts short impulse signals 222, as a graph of voltage versus time, which may create interference during the transmission of bits across a link. The short impulse signals as shown in FIG. 2 correspond to the ISO 7637-3 capacitive coupling test (CCC). In FIG. 2, $U_s$ is the maximum amplitude of the impulse signals, $t_1$ is the 10% pulse width, $t_d$ is the pulse duration, and $t_r$ is the rise time, where example values are: $U_s$=60 V, $t_r$=5 ns, $t_d$=50 ns, $t_1$=100 μs, $t_4$=10 ms, and $t_5$=90 ms.

Figure 3A:
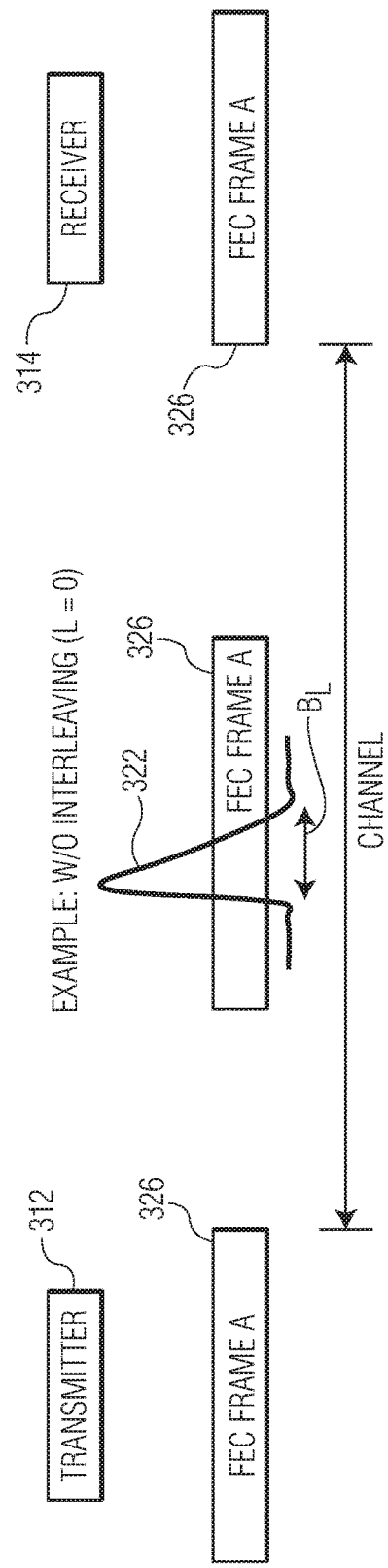
FIG. 3A illustrates how a short impulse signal, or burst error, may coincide with transmission of a forward error correction (FEC) frame.
Figure 3B:
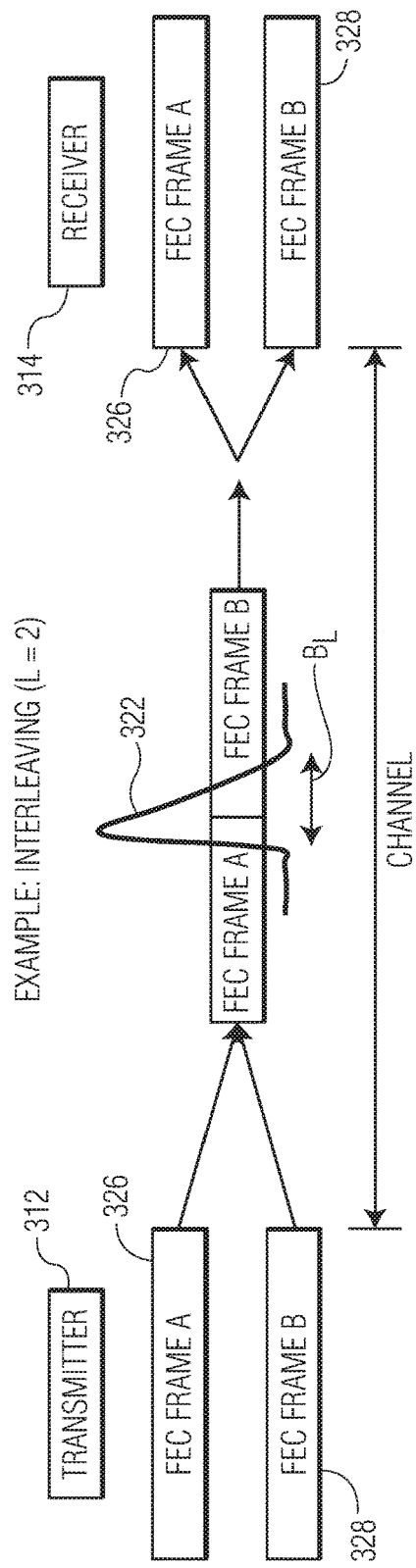
FIG. 3B illustrates two different FEC frames that are interleaved with each other during transmission across the channel along with a short impulse signal that coincides with an interleaved FEC frame.

FIG. 3A illustrates how a short impulse signal 322, or burst error, may coincide with transmission of a forward error correction (FEC) frame 326 from a transmitter 312 to a receiver 314 over a channel, where the FEC frame includes uncoded data and parity bits and may utilize Reed-Solomon encoding. As shown in FIG. 3A, the burst error coincides with FEC frame A over a significant portion of the FEC frame. If the burst error coincides with too much of the FEC frame, then the FEC frame may not be able to be recovered by the receiver. FEC frame interleaving has been used to improve the performance of Ethernet network communications. FIG. 3B illustrates two different FEC frames 326 and 328 that are interleaved with each other during transmission across the channel. In an embodiment, interleaving is a process that splits a frame in subsets/portions and combines and/or concatenates subsets/portions from different FEC frames to form an FEC frame that is transmitted across a link. For example a portion of FEC frame A is concatenated with a portion of FEC frame B. FIG. 3B also illustrates how a short impulse signal 322, or burst error, may coincide with transmission of the two interleaved FEC frames. Using FEC frame interleaving, it is less likely that a burst error will render an FEC frame unrecoverable, thus increasing transmission performance across a link. For example, for a given burst error length ($B_L$) without interleaving, the FEC encoding needs to have twice the burst error correction capability than with interleaving, e.g., interleaving of two FEC frames, L=2.

The length of the Reed-Solomon codes that are used for forward error correction, impacts the time required for correction and/or the complexity of the processing needed for correction. Interleaving can be implemented to reduce the complexity of a Reed-Solomon decoder, however, interleaving can add latency. For example, a 10 bit Reed-Solomon code for a burst error length of 100 ns ($B_L$=100 ns) with interleaving L=2 can add approximately 35% overhead in Reed-Solomon latency.

In automotive in-vehicle networks, there may be different requirements for the network depending on the application. Some applications, such as safety critical applications, may have stringent quality-of-service (QoS) requirements, e.g., low bit-error-rate (BER) which needs a scheme to correct longer burst errors and low latency which needs a correction scheme that exhibits low latency. Other applications, such as entertainment applications, can handle a higher BER, but still need low latency. Thus, the specific FEC encoding and interleaving that is ideal for a particular application in an in-vehicle network is dependent on the application. In Ethernet based in-vehicle networks, FEC encoding and interleaving is implemented at the physical layer, typically by physical layer integrated circuit (IC) devices, referred to herein as "PHY chips." Conventional PHY chips typically can support different combinations of FEC encoding and interleaving, with a specific combination of FEC encoding and interleaving being either pre-configured in the PHY chips in the network or negotiated between PHY chips during set up of a communications link between two nodes, e.g., during a training period. Although this approach works well to initially establish a communication link, the approach does not provide flexibility to adapt to conditions that may change during the lifetime of the communications link, e.g., changes in link conditions and/or changes in the requirements of the communications link due to, for example, a change in the application that is utilizing the link.

In accordance with an embodiment of the invention, a method for performing physical layer operations in a communications network involves receiving, from a link in the communications network, information in an operations, administration, and management (OAM) word, setting an interleaving level, L, in response to the information received in the OAM word, inserting an OAM word into a forward error correction (FEC) frame, the OAM word including the set interleaving level, L, and transmitting, onto the link in the point-to-point network, the FEC frame, which includes the OAM word. Using an OAM word inserted into an FEC frame to communicate changes in the level of interleaving, L, the level of interleaving can be adjusted in real-time to, for example, adapt to conditions on the link (e.g., burst errors) that may affect the BER and/or to adapt to changes in the application that is utilizing the link in the point-to-point network. In an embodiment, the BER is monitored at a receiving PHY chip and communicated to a transmitting PHY chip and the level of interleaving used at the transmitting PHY chip can be adjusted in real-time in response to the BER to adapt to changes in the BER. For example, if the BER becomes too high, then the level of interleaving at the transmitting PHY chip can be increased to reduce the BER and if the BER drops below a threshold, the level of interleaving at the transmitting PHY chip can be reduced to a more efficient level, e.g., a level with reduced processing requirements, which may translate to lower latency and/or lower power consumption. In another embodiment, a latency requirement is monitored at a node (e.g., through a latency register) and the level of interleaving used at the transmitting PHY chip is adjusted in real-time to adapt to changes in the latency requirement. For example, a higher level layer may signal to the PHY chip that the latency requirement for an application has increased (e.g., the data is more time sensitive) and thus the level of interleaving for upcoming data transmissions across the link can be reduced or the higher level layer may signal to the PHY chip that the latency requirement for an application has decreased (e.g., the data is less time sensitive) and thus the level of interleaving for upcoming data transmissions across the link can be increased to, for example, provide a lower BER. Using an OAM word inserted into an FEC frame that also carries payload data to communicate changes in the level of interleaving, L, provides for an efficient way to adapt the level of interleaving in real-time (e.g., "on-the-fly") to a level of interleaving that is desirable for the current set of circumstances.

Figure 4A:
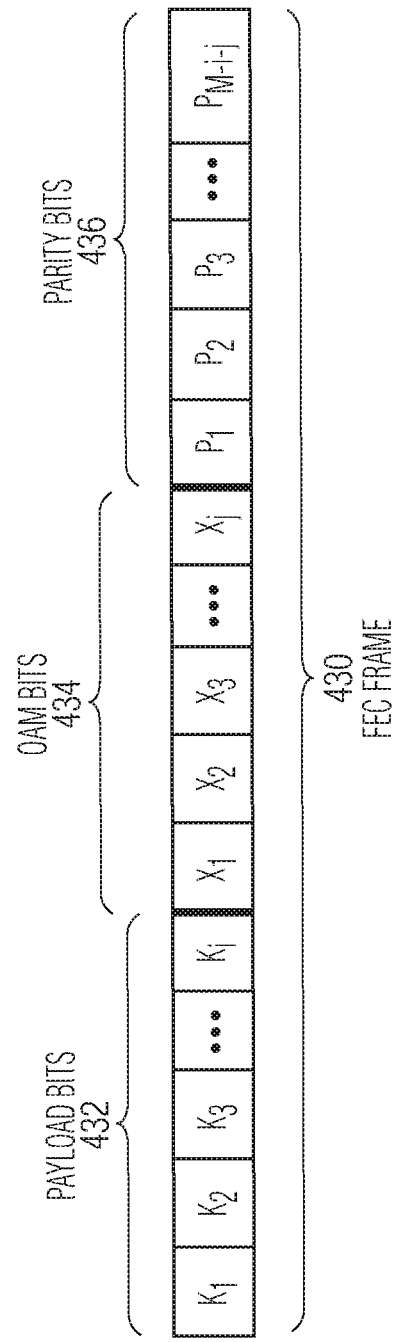
FIG. 4A depicts an example of an FEC frame that can be used to communicate information that is used to set and/or adjust the level of interleaving in an Ethernet based in-vehicle network.

As described above, the technique for performing physical layer operations in a communications network involves utilizing an OAM word in an FEC frame. FIG. 4A depicts an example of an FEC frame 430 (M bits) that can be used to communicate information that is used to set and/or adjust the level of interleaving in an Ethernet based in-vehicle network. As depicted in FIG. 4A, the FEC frame 430 includes payload bits 432 (K bits, $K_1$, $K_2$, $K_3$, ... $K_i$) and OAM bits 434 (X bits, $X_1$, $X_2$, $X_3$, ... $X_j$) (also referred to collectively herein as an "OAM word"), with parity bits 436 (P bits, $P_1$, $P_2$, $P_3$, ... $P_{M-i-j}$) interspersed within the payload bits and the OAM bits. In the example of FIG. 4A, the payload bits include bits of data received from a higher layer in the network stack, e.g., from the data link layer and which are intended to be communicated across the link to the same higher layer in the receiving node, the OAM bits include bits of operations, administration, and management information that are communicated between the physical layers (e.g., between the PHY chips) in OAM words, and the parity bits are bits added to strings of binary values in the FEC frame to provide a check on the corresponding bit values in the FEC frame. In an embodiment, an FEC frame is M bits, including K bits of data, X bits of OAM data, and M-K-X parity bits.

Figure 4B:
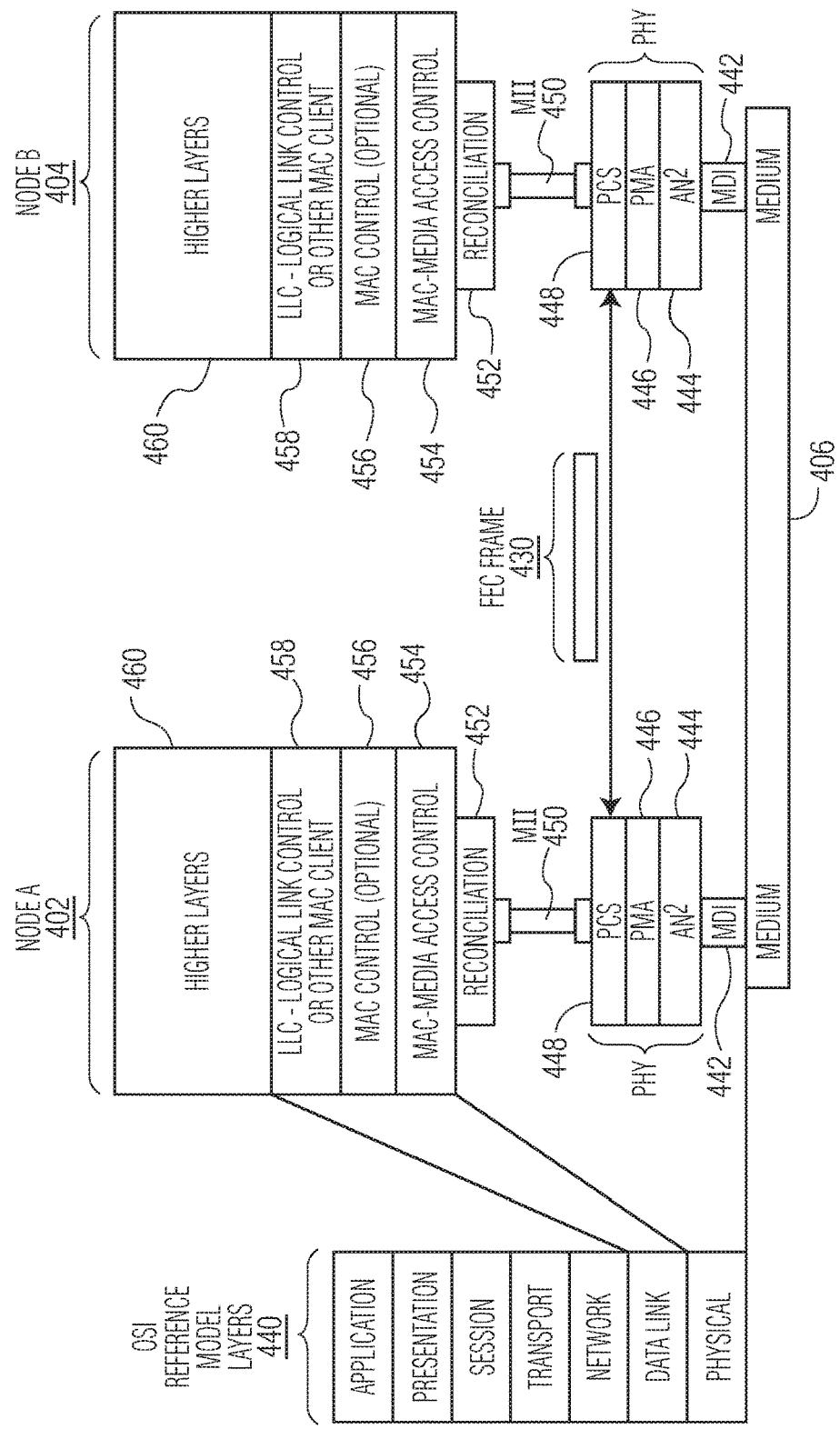
FIG. 4B illustrates the communication of an FEC frame between two nodes in an Ethernet based in-vehicle network.

FIG. 4B illustrates the communication of an FEC frame 430 between two nodes, node A 402 and node B 404, in an Ethernet based in-vehicle network. FIG. 4B depicts the layers of the OSI reference model 440 as well as an expanded view of the physical layer and the data link layer. As shown in FIG. 4B, the OSI reference model includes the physical layer (also referred to as layer 1), the data link layer (also referred to as layer 2), the network layer (also referred to as layer 3), the transport layer (also referred to as layer 4), the session layer (also referred to as layer 5), the presentation layer (also referred to as layer 6), and the application layer (also referred to as layer 7). Elements in the expanded view of the physical layer include media-dependent sublayers of the transmission medium 406, a media-dependent interface (MDI) 442, an auto-negotiation layer (AN2) 444, a physical medium attachment (PMA) 446, and the physical coding sublayer (PCS) 448, and media-independent sublayers of a media-independent interface (MII) 450, and a reconciliation layer 452. Elements in the expanded view of the data link layer include the media access control (MAC) layer 454, the MAC control layer (optional) 456, and the logical link control (LLC) 458, or other MAC client, layer. Higher layers 460 may be implemented above the data link layer.

Figure 5:
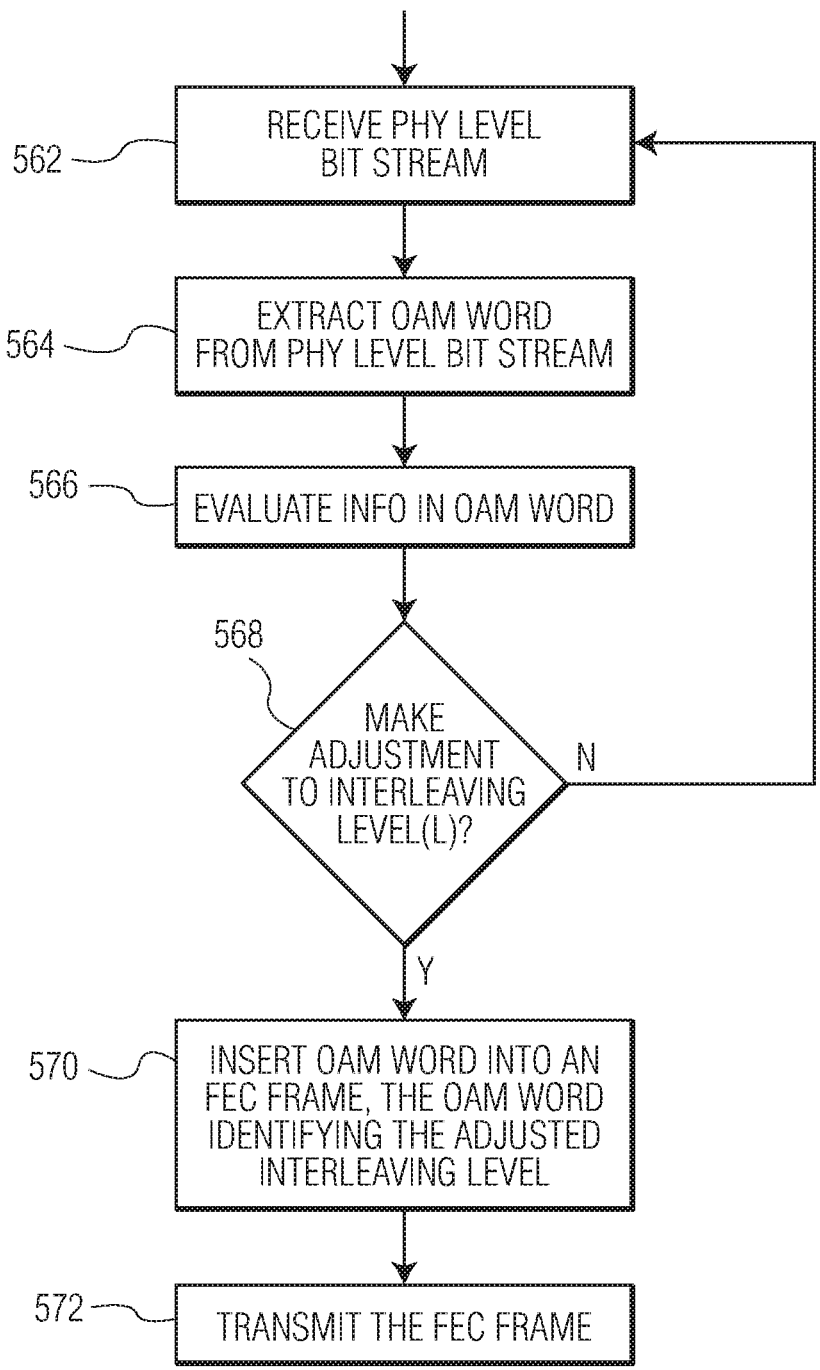
FIG. 5 depicts an embodiment of a method for performing physical layer operations in a point-to-point network.

FIG. 5 depicts an embodiment of a method for performing physical layer operations in a point-to-point network. At block 562, a bitstream is received at the physical level, for example, an FEC frame is received at a PHY chip of a first node from a PHY chip of a second node over an unshielded twisted pair link. At block 564, an OAM word is extracted from the bitstream, e.g., an OAM word is extracted from an FEC frame. At block 566, the OAM word is evaluated, for example, the OAM word may include BER information that was generated by the PHY chip at the other end of the link. In an embodiment, the BER is used to determine whether or not the level of interleaving should be adjusted. For example, if the BER is too high, then the level of interleaving may need to be increased to reduce the BER and if the BER is below a pre-defined threshold, the level of interleaving can be reduced, e.g., to a level with reduced processing requirements, which may translate to lower latency and/or lower power consumption. In response to the evaluation, at decision point 568, it is determined whether or not to adjust the level of interleaving, L. If the level of interleaving, L, is not to be adjusted, then the process returns to block 562 and if the level of interleaving is to be adjusted, then the process proceeds to block 570. At block 570, an OAM word is inserted into an FEC frame, the OAM word identifying the adjusted level of interleaving. In one embodiment, the OAM word identifies a specific level of interleaving (e.g., L=0, 2, 4, etc.) and in another embodiment, the OAM word identifies a level adjustment (e.g., reduce L by one step or increase L by one step). At block 572, the FEC frame is transmitted from the node on a link in the point-to-point network, the FEC frame including the OAM word with data that identifies the level of interleaving. The node that receives the FEC frame can then extract the OAM word and use the data that identifies the level of interleaving to set the level of interleaving for subsequent transmissions from the respective node and/or to set the level of interleaving for decoding FEC frames that are received at the node. Thus, the level of interleaving used between two nodes in a point-to-point Ethernet-based network can be communicated between the nodes in an OAM word of an FEC frame that also carries payload data to make real-time adjustments to the level of interleaving, for example, adjustments to the level of interleaving that are made in response to BER information that is reflective of real-time conditions on the link between the two nodes.

Figure 6:
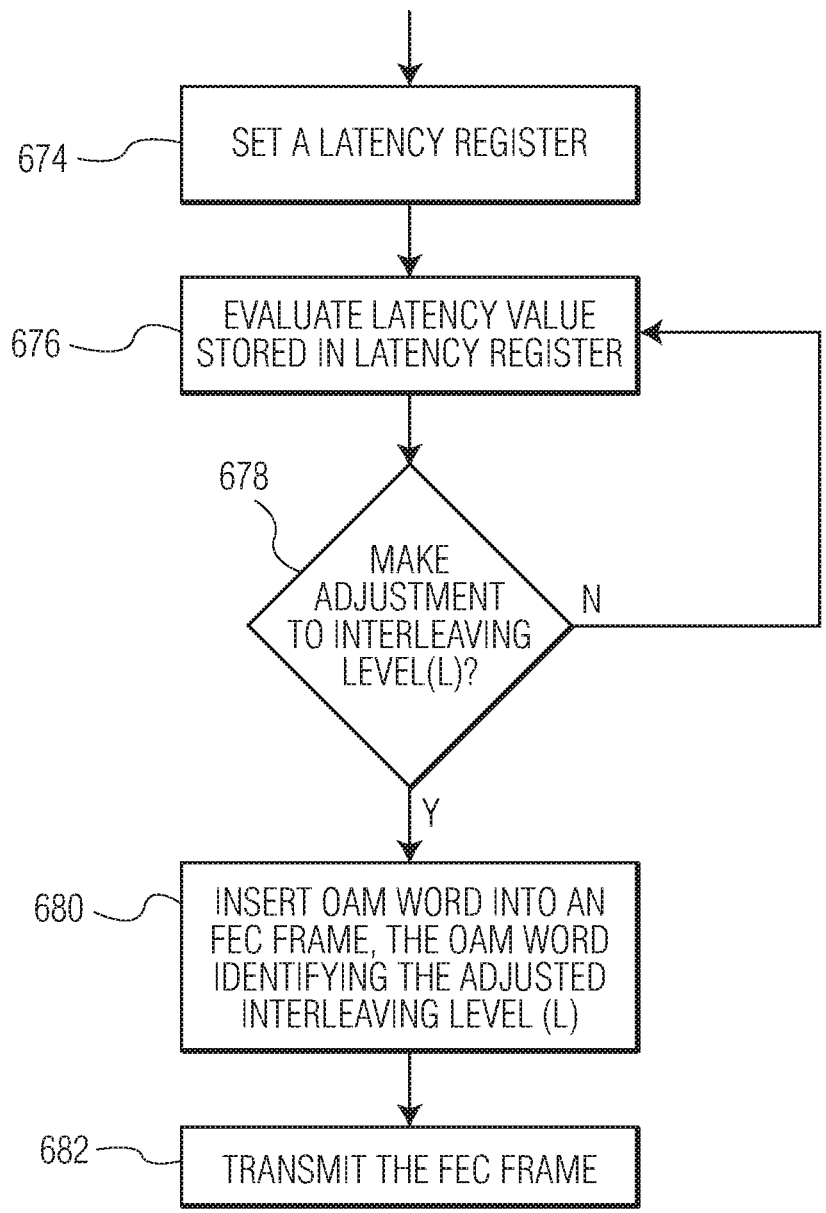
FIG. 6 depicts an embodiment of a method for performing physical layer operations in a communications network.

FIG. 6 depicts an embodiment of a method for performing physical layer operations in a communications network. At block, 674, a latency register, which includes a value that represents a desired latency or a latency requirement, is set. For example, the latency register is set through a management data input/output (MDIO) interface that communicates between the physical layer and the data link layer. In another embodiment, an indication of a latency requirement can be signaled by other parameters. For example, a latency requirement can be signaled from information that indicates the higher level application that is providing the bitstream that is to be transmitted across the link. In an embodiment, the latency register may indicate a particular maximum latency level or a particular maximum latency time. For example, a higher level layer may signal to the PHY chip that the latency requirement for an application has increased (e.g., less delay is acceptable) and thus the level of interleaving for upcoming data transmissions across the link can be reduced or the higher level layer may signal to the PHY chip that the latency requirement for an application has decreased (e.g., more delay is acceptable) and thus the level of interleaving for upcoming data transmissions across the link can be increased to, for example, provide a lower BER. At block 676, the latency value stored in the latency register is evaluated. In response to the evaluation, at decision point 578, it is determined whether or not to adjust the level of interleaving, L. If the level of interleaving, L, is not to be adjusted, then the process returns to block 676 and if the level of interleaving is to be adjusted, then the process proceeds to block 680. At block 680, an OAM word is inserted into an FEC frame, the OAM word identifying the adjusted level of interleaving. In one embodiment, the OAM word identifies a specific level of interleaving (e.g., L=0, 2, 4, etc.) and in another embodiment, the OAM word identifies a level adjustment (e.g., reduce L by one step or increase L by one step). At block 682, the FEC frame is transmitted from the node on a link in the communications network, the FEC frame including the OAM word with data that identifies the level of interleaving. The node that receives the FEC frame can then extract the OAM word and use the data that identifies the level of interleaving to set the level of interleaving for subsequent transmissions from the respective node and/or to set the level of interleaving for decoding FEC frames that are received at the node. Thus, the level of interleaving used between two nodes in an Ethernet-based network can be communicated between the nodes in an OAM word of an FEC frame that also carries payload data to make real-time adjustments to the level of interleaving, for example, adjustments to the level of interleaving that are made in response to latency information received from a higher layer in the node, e.g., from the application layer.

Figure 7:
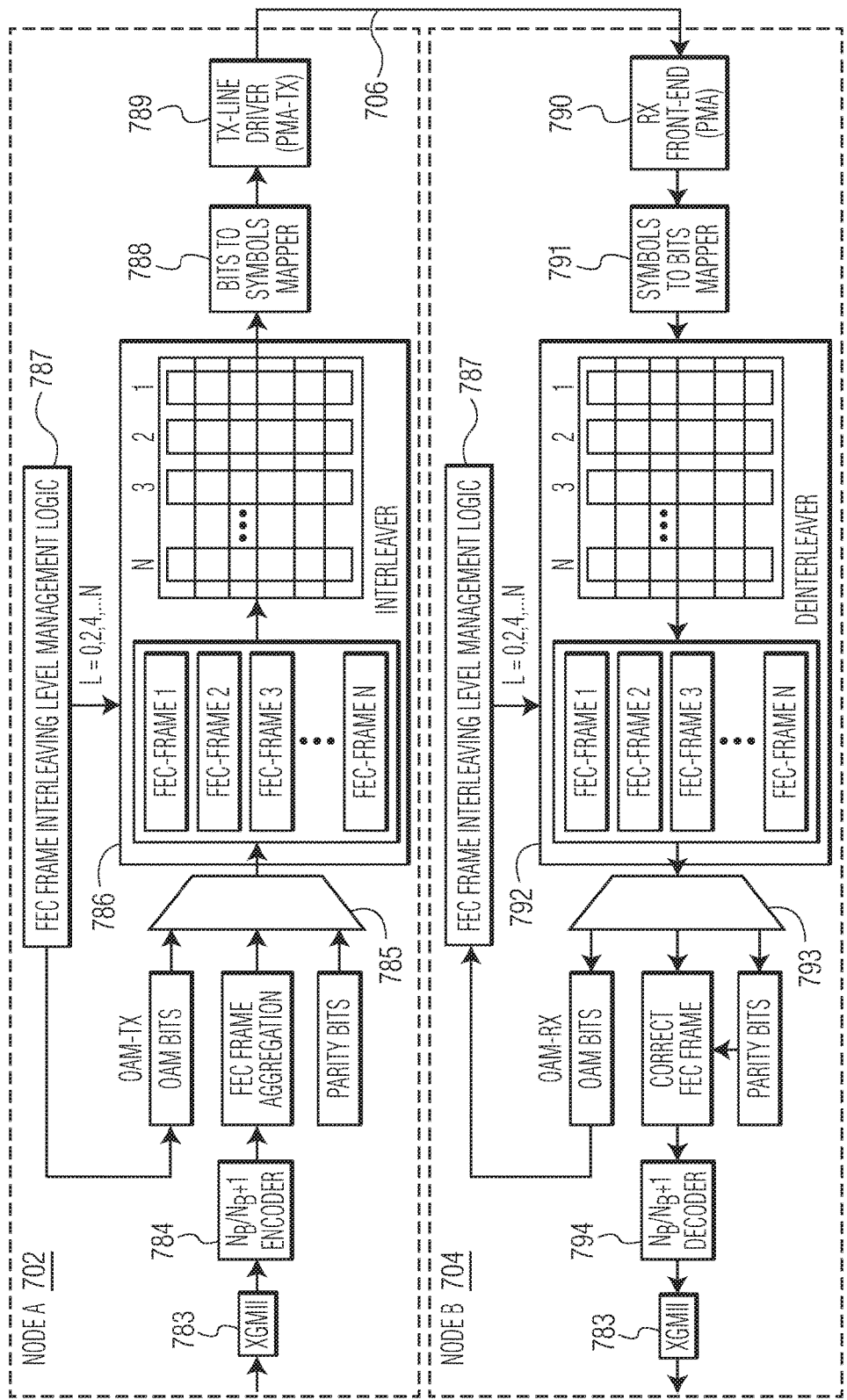
FIG. 7 illustrates the interleaving of FEC frames at the physical level between two nodes in a network.

FIG. 7 illustrates the interleaving of FEC frames at the physical level between two nodes, node A 702 and node B 704, in a point-to-point network that utilizes, for example, Ethernet. In the example of FIG. 7, node A transmits interleaved FEC frames on physical link 706 and node B receives interleaved FEC frames on the physical link. As depicted in FIG. 7, node A includes a gigabit MII (XGMII) 783, an $N_B/N_B+1$ encoder 784 (wherein $N_B$ is the number of bits in a word), a multiplexer 785, an interleaver 786, FEC frame interleaving level management logic 787, a bits-to-symbols mapper 788, and a TX-line driver (PMA-TX) 789, and node B 704 includes an RX front-end (PMA-RX) 790, a symbols-to-bits mapper 791, a deinterleaver 792, FEC frame interleaving level management logic 787, a demultiplexer 793, an N/N+1 decoder 794, and a gigabit MII (XGMII) 783.

In operation (described from transmission to reception), a bitstream is received at node A 702 (e.g., at a PHY chip) via the XGMII 783 and passed to the $N_B N_B+1$ encoder 784 for $N_B/N_B+1$ bit encoding. The $N_B/N_B+1$ encoded bits are then combined with OAM bits and parity bits at the multiplexer to form FEC frames. In an embodiment, OAM bits that indicate the level of interleaving and/or the BER at the node are received from the FEC frame interleaving level management logic 787 as indicated in FIG. 7. Other information related to setting/adjusting the level of interleaving can also be communicated via OAM words. As shown in FIG. 7, FEC frames 1, 2, 3, ... N are generated and buffered in the interleaver 786. The frames are interleaved according to a level of interleaving that is specified by the FEC frame interleaving level management logic 787. For example, the FEC frame interleaving level management logic 787 communicates a level of interleaving as a value, L=0, 2, 4, ... N, where L=0 indicates no interleaving, L=2 indicates that two FEC frames are interleaved together, L=4 indicates that four FEC frames are interleaved together, and L=N indicates that N FEC frames are interleaved together, where N is an integer greater than 1. In an embodiment, an even number of FEC frames is interleaved together for convenience although it is possible to interleave an odd number of FEC frames together. The interleaving of N FEC frames is illustrated in FIG. 7 by the FEC frames first (from left to right) being represented horizontally and then being represented vertically such that a portion of each of the FEC frames is concatenated into a stream of bits that includes interleaved bit strings from each FEC frame. The interleaved frames are then mapped from bits to symbols by the bits-to-symbols mapper 788 and then converted to analog signals that are transmitted on the link 706 by the TX-line driver (PMA) 789. The transmissions are received by the RX front-end (PMA) 790 of node B 704, which converts the analog signals to received symbols, and the received symbols are mapped to bits by the symbols-to-bits mapper 791. The deinterleaving of N FEC frames is illustrated in FIG. 7 by the FEC frames first (from right to left) being represented vertically and then being represented horizontally. The frames are deinterleaved according to a level of interleaving that is specified by the FEC frame interleaving level management logic 787. For example, the FEC frame deinterleaving level management logic communicates a level of interleaving as a value, L=0, 2, 4, ... N, where L=0 indicates no interleaving, L=2 indicates that two FEC frames are interleaved together, L=4 indicates that four FEC frames are interleaved together, and L=N indicates that N FEC frames are interleaved together, where N is an integer greater than 1. In an embodiment, the level of deinterleaving matches the level of interleaving that was used by node A for transmission of the FEC frames, where the level of interleaving is communicated between the two nodes using OAM words inserted into the FEC frames. Once the FEC frames are deinterleaved, the bits that make up an FEC frame are identified by the demultiplexer 793. For example, the bits of the FEC frames are identified as payload bits, OAM bits, or parity bits. The payload bits are then decoded by the $N_B/N_B+1$ decoder 794. The decoded bits are passed to the XGMII 783, which can pass the bits to a higher layer application. In an embodiment, the OAM bits (e.g., in the form of an OAM word) are extracted from the FEC frames and provided to the FEC frame interleaving level management logic 787 as indicated in FIG. 7. As described herein, the OAM word may include information about BER from the other node and/or information about a level of interleaving (e.g., a value for L) from the other node. Other information related to setting/adjusting the level of interleaving can also be communicated via OAM words.

In an embodiment, the logic for determining the level of FEC frame interleaving, L, can be BER based and/or latency based. In a BER based approach, if the burst error correction requirement is higher than a current setting, then the value of interleaving level, L, is increased until the monitored BER satisfies the requirement. Otherwise, if the burst error correction requirement is lower than the current setting, then the value of the interleaving level, L, is decreased. In a latency based approach, the latency requirement is monitored in register. If the latency requirement (as indicated by the register value) is shorter than the current setting, then the value of the interleaving level, L, is decreased until the interleaving level satisfies the requirement. Otherwise, if the latency requirement is longer than the current setting and error correction requirement is stringent, then the value of the interleaving level, L, is increased. Other parameters and/or criteria may be used to set the level of interleaving, L, and/or other values/information may be carried in an OAM word to communicate information that is used to set the level of interleaving, L.

Figure 8:
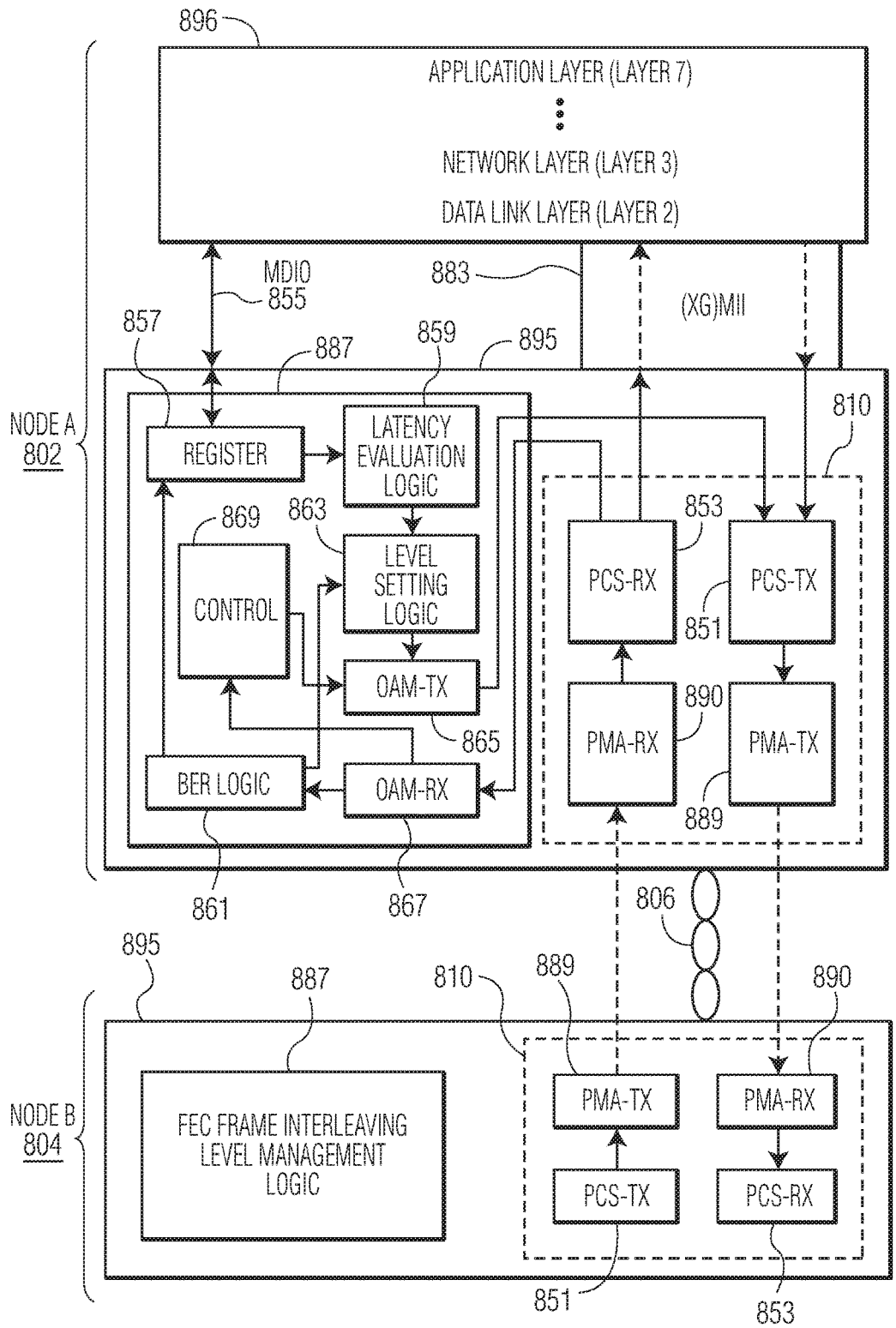
FIG. 8 depicts an example of components at the physical level of two nodes in a communications network that are connected by a link.

FIG. 8 depicts an example of components at the physical level of two nodes, node A 802 and node B 804, in a point-to-point communications network that are connected by a link 806. In the example of FIG. 8, the physical layers are embodied as integrated circuits 895 that incorporate physical layer functionality, referred to herein as "PHY chips." The PHY chips 895 may be components of the nodes A and B, respectively, and the nodes may include additional elements, such as elements of an electronic control unit (ECU) as is known in the field of in-vehicle networks. For example, ECUs may also include a microprocessor, a sensor, an actuator, etc. as is known in the field. FIG. 8 also depicts higher level layers of the node, e.g., the data link layer (layer 2), the network layer (layer 3), and the application layer (layer 7), which may interact with the physical layer.

With reference to node A, 802, the PHY chip 895 includes a transceiver 810 that includes a physical coding sublayer transmitter (PCS-TX) 851, a physical medium attachment transmitter (PMA-TX) 889, a physical coding sublayer receiver (PCS-RX) 853, a physical medium attachment receiver (PMA-RX) 890, FEC frame interleaving level management logic 887, a MII 883 (e.g., XGMII), and an MDIO 855. In the embodiment of FIG. 8, the FEC interleaving level management logic 887 includes a register 857, latency evaluation logic 859, BER logic 861, level setting logic 863, an OAM-TX module 865, an OAM-RX module 867, and control logic 869. The physical medium attachment transmitter (PCS-TX) 851, the physical medium attachment transmitter (PMA-TX) 889, the physical coding sublayer receiver (PCS-RX) 853, and the physical medium attachment receiver (PMA-RX) 890 perform functions that include functions which are known, for example, in the field of Ethernet based in-vehicle networks. The register is a memory register that stores information that can be used to determine the level of interleaving that is employed by the PHY chip.

In an example of a transmission operation, the register 857 receives information about latency from a higher layer and/or information about BER from the BER logic 861. The latency evaluation logic 859 is configured to evaluate latency information to, for example, determine a desired latency for a particular bitstream. The level setting logic 863 is configured to set or adjust the level of interleaving based on, for example, latency information from the latency evaluation logic 859 and/or BER information from the BER logic

861. The level of latency that is set by the level setting logic 863 is provided to the OAM-TX module 865. The OAM-TX module 865 may include buffering memory and/or logic to provide OAM bits (e.g., as an OAM word) to the transceiver 810 for insertion into an FEC frame and/or to set the level of interleaving for the PCS-TX 851. In an embodiment, the PCS-TX 851 is configured to perform the multiplexing, FEC frame interleaving, and bits-to-symbols mapping as described with reference to FIG. 7. The FEC frames are transmitted on the link 806 as analog signals by the PMA-TX 889.

In an example of a receive operation, the PMA-RX 890 of node A 802 receives electrical signals on the link 806, decodes the signals into symbols, and provides the symbols to the PCS-RX 853. The PCS-RX maps the symbols to a bitstream, deinterleaves the FEC frames, and demultiplexes the OAM bits and the payload bits as described with reference to FIG. 7. An OAM word extracted from an FEC frame by the PCS-RX 853 is provided to the OAM-RX module 867 for evaluation. Depending on the contents of the OAM word, the data carried in the OAM word may be provided to the BER logic 861 and/or to the control logic 869. In an embodiment where the data carried in the OAM word includes information about the BER of the transmitting node (e.g., node B), the OAM-RX module 867 may provide information about the BER to the BER logic 861. In response to the information about the BER, the BER logic 861 may provide information for storage in the register 857 and/or may provide information for use in setting/adjusting the level of interleaving, L. In an embodiment where the data carried in the OAM word includes information about the level of interleaving from the transmitting node (e.g., the level, L, of interleaving from node B), the level of interleaving may be provided to the control module 869, which can manage negotiation of the interleaving level between nodes and/or communicate the level of interleaving in an OAM word. The control module may also inform the PCS-TX 851 of the level of interleaving for transmission and inform the PCS-RX 853 of the level of interleaving for reception of the FEC frames.

In an embodiment, the information held in the register 857 of the FEC interleaving level management logic 887 is read only, while in other embodiments, at least some of the information can be written to the register by end users. Internal health related data or performance related data can be also stored in the register and later read by end users for certain applications.

In an embodiment, the OAM bits are used to pass information from a local PHY chip to a remote PHY chip. As shown in FIG. 7, the OAM bits are embedded into the bitstream of data that is received from a higher layer, e.g., from the data link layer. The OAM bits may include information related to, for example, node health, control, managing link partners, interoperability, and interleaving.

In an embodiment, OAM bits are used by a node to communicate with a remote node to agree on the timing to start a new configuration, e.g., a new level of interleaving.

In an embodiment, OAM bits are used by a receiving node to learn the status of the physical layer (e.g., PHY chip) of a transmitting node and/or to communicate certain defined/agreed actions. The OAM bits can be used to communicate between two PHY chips to agree on the timing to start a new configuration, e.g., a new level of interleaving.

In an embodiment, an end user can set a latency requirement for the target application, which can be written into the register through the MDIO interface. The latency can be read from the register to determine the level of interleaving, L, for a forward error correction scheme. After receiving OAM bits from a remote transmitter PHY chip, the BER logic can extract information that is related to burst error and/or the BER of a channel. The information can be shared with the register if, for example, the end users would like to read the information from the register for further processing at the application layer. BER information and/or burst error information can be provided to the level setting logic to identify a new level of interleaving, L. The level setting logic is configured to identify a value, L, using, for example, burst errors/BER and latency. The value of L can be provided to the OAM-TX module. In an embodiment, the control module is configured to provide control related information to the OAM-TX module such that a remote PHY chip can configure its settings based on the received information, e.g., as received through and OAM word at its OAM-RX module.

In an embodiment, link partners (i.e., nodes) agree/disagree to decrease the value of L. Link partners communicate through OAM bits to decrease the value of L and link partners communicate through OAM bits to increase the value of L. For example, link partners agree on the timing (e.g., when) to change the level of interleaving, L, for the next session at the transmitter and the receiver of both link partners so that the transmissions can be decoded correctly. In an embodiment, the receiver of a link partner receives an adjusted value of L and acknowledges through OAM bits that it is willing to increase the value of L.

In an embodiment, the OAM bits are used to indicate to a link partner that the number of errors is increasing or that the number of errors is decreasing. Using the above-described technique, a single PHY chip can be used for multiple different applications without having to redesign the chip. Thus, the PHY chips can be produced in volume, which can result in a product cost savings. Additionally, operation of a PHY chip as described above can save power by optimizing the level of interleaving to meet the needs to the application.

In an embodiment, the elements of the physical layer as shown in FIGS. 7 and 8 can be integrated into an IC device that includes other functionality, such as microprocessor functionality. For example, the components of a traditional PHY chip can be integrated onto a System-on-Chip (SoC).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing physical layer operations in a communications network, the method comprising:
   receiving, from a link in the communications network, information in an operations, administration, and management (OAM) word;
   setting an interleaving level, L, in response to the information received in the OAM word, wherein L is an integer greater than one;
   inserting the OAM word into a forward error correction (FEC) frame, the OAM word including the set interleaving level (L); and
   transmitting, onto the link in the communications network, the FEC frame, which includes the OAM word.

2. The method of claim 1, further comprising adjusting the interleaving level, L, in response to information received in a subsequent OAM word and transmitting another OAM word that includes the adjusted interleaving level, L, in a subsequent FEC frame.

3. The method of claim 1, wherein the FEC frame includes a bitstream from a higher network layer.

4. The method of claim 3, wherein the interleaving level, L, indicates interleaving of N or more frames, where N is an integer of greater than or equal to two.

5. The method of claim 1, wherein the interleaving level, L, is an integer value that indicates a number of FEC frames that are to be interleaved.

6. The method of claim 1, wherein the received OAM word is extracted from a received bitstream at a physical coding sublayer receiver (PCS-RX) and wherein the transmitted OAM word is inserted into a transmitted bitstream at a physical coding sublayer transmitter (PCS-TX).

7. The method of claim 1, wherein the information received in the OAM word is information related to a bit error rate (BER) at a remote node.

8. The method of claim 7, wherein the interleaving level, L, is increased in response a BER increasing.

9. The method of claim 7, wherein the interleaving level, L, is decreased in response to a BER decreasing.

10. A physical layer (PHY) device for a communications network, the PHY device comprising:
    a physical coding sublayer transmitter (PCS-TX);
    a physical medium attachment transmitter (PMA-TX);
    a physical coding sublayer receiver (PCS-RX);
    a physical medium attachment receiver (PMA-RX); and
    forward error correction (FEC) frame interleaving level management logic, the FEC frame interleaving level management logic configured to:
    receive, from the PCS-RX and the PMA-RX, information in an operations, administration, and management (OAM) word;
    set an interleaving level, L, in response to the information received in the OAM word; insert the OAM word into a forward error correction (FEC) frame, the OAM word including the set interleaving level (L); and
    communicate the FEC frame to the PCS-TX for transmission via the PMA-TX.

11. The PHY device of claim 10, further comprising:
    transmitting, onto a link in the communications network, the FEC frame, which includes the OAM word.

12. The PHY device of claim 11, wherein the FEC frame interleaving level management logic is further configured to adjust the interleaving level, L, in response to information received in a subsequent OAM word and to transmit another OAM word that includes the adjusted interleaving level, L, in a subsequent FEC frame.

13. The PHY device of claim 10, wherein the information received in the OAM word is information related to a bit error rate (BER) at a remote node.

14. The PHY device of claim 13, wherein the interleaving level, L, is increased in response a BER increasing or wherein the interleaving level, L, is decreased in response to a BER decreasing.

15. A method for performing physical layer operations in a communications network, the method comprising:
    setting an interleaving level, L, at a node in the communications network, wherein L is an integer greater than one;
    inserting an operations, administration and management (OAM) word into a forward error correction (FEC) frame, the OAM word including the set interleaving level, L; and
    transmitting, onto a link in the communications network, the FEC frame, which includes the OAM word.

16. The method of claim 15, wherein the FEC frame includes a bitstream from a higher network layer.

17. The method of claim 15, wherein setting the interleaving level, L, comprises obtaining latency information from a latency register, and setting the interleaving level, L, in response to the latency information.

18. The method of claim 17, wherein the latency information is received at the register from a higher layer than a physical layer.

19. The method of claim 17, wherein the interleaving level, L, is increased in response the latency information indicating that payload data carried in the FEC frame is less time sensitive.

20. The method of claim 17, wherein the interleaving level, L, is decreased in response to the latency information indicating that payload data carried in the FEC frame is more time sensitive.

* * * * *